Dec. 21, 1954    K. O. HEINTZ    2,697,828
REFLECTOR FOR ELECTROMAGNETIC WAVES
Filed Dec. 29, 1949    2 Sheets-Sheet 1

INVENTOR.
Karl O. Heintz,
BY Dwight C. Otis
AGENT.

Dec. 21, 1954 K. O. HEINTZ 2,697,828
REFLECTOR FOR ELECTROMAGNETIC WAVES
Filed Dec. 29, 1949 2 Sheets-Sheet 2

FIG. IA.

*INVENTOR.*
Karl O. Heintz
BY Dwight C. Otis
AGENT.

United States Patent Office 2,697,828
Patented Dec. 21, 1954

2,697,828

REFLECTOR FOR ELECTROMAGNETIC WAVES

Karl O. Heintz, Houston, Tex., assignor, by mesne assignments, to Standard Oil Development Company, Elizabeth, N. J., a corporation of Delaware Application December 29, 1949, Serial No. 135,786

4 Claims. (Cl. 343—18)

The present invention relates to improvements in electromagnetic wave reflector systems. More particularly, the invention relates to an improved corner reflector for radar systems.

In the art of navigation or of surveying employing narrow beams of electromagnetic waves, it is well known to emit pulsed signals and measure the time required for the signals to return to the point of emission after reflection from a distant object whereby the distance of the object from the point of emission may be determined. Radar systems useful for this purpose, accordingly, conventionally include a suitable transmitter means for emitting ultra high frequency electromagnetic waves, antenna means for directing a beam of said waves along one or more selected paths, and means for receiving and displaying electromagnetic wave energy reflected back to the antenna substantially along said path of emission. It is also well known that objects which are good conductors of electricity are better reflectors of electromagnetic waves than are non-conductors. However, the distance from which an object may be detected, that is, the distance from which sufficient electromagnetic wave energy is reflected back to the point of emission, within conventional limits, is inversely proportional to the wave length of the electromagnetic waves and, when the wave transmission range is not exceeded, is directly proportional to the area of the surface from which the waves are reflected.

Prior workers have shown that the apparent reflecting area of a surface to very short wave length electromagnetic waves may be increased many times if the surface is broken up into a plurality of smaller plane surfaces and these plane surfaces are arranged mutually perpendicular and intersecting each other, thereby forming a trihedron or corner reflector. Prior workers have also shown that the distance or range from which such a trihedron may be detected is dependent upon the angle at which the beam of electromagnetic waves intersects the trihedral angle formed by the mutually perpendicular surfaces. The optimum angle has been found to be one wherein the beam of waves enters the trihedral angle along a path which is at an angle of 45 degrees with respect to two of the plane surfaces making up the reflector and at an angle of approximately 35 degrees with respect to the third plane. When arranged in the above-described manner, trihedrons or corner reflectors have heretofore been employed as markers in radar navigation or surveying systems.

Since stationary markers of the above-described corner reflector type are sometimes difficult to distinguish from larger background objects or from ground reflections when viewed upon the cathode ray screen or indicator of a conventional radar receiving system, prior workers have proposed to cause modulation of the reflected wave beam by rotating a single corner reflector about an axis which is parallel to two of the plane surfaces making up the reflector, or by moving one of the planes thereof in a manner to change its angular relation to the other two planes. While these modifications of the basic corner reflector have been useful in certain installations, they have been found to be costly to construct and maintain, and have lacked portability for use in surveying since artificial motive power, and usually a gear-train mechanism of one form or another, have been required to cause movement of the movable element.

One object of the present invention is to provide an electromagnetic wave reflector which will enable identification of waves reflected therefrom distinct from waves reflected by other bodies.

Another object of the present invention is to provide an electromagnetic wave reflector device which may be caused to rotate and reflect waves omni-directionally in a preselected plane.

Still another object of the present invention is to provide an electromagnetic wave marker reflector device which may be caused to rotate in response to wind or air currents applied thereto.

A further object of the invention is to provide a reflector device which may be moved readily from place to place.

Other and further objects of the invention will be apparent from the following description when read in conjunction with the accompanying drawing in which Fig. 1 is a perspective view of a preferred embodiment of the present invention employing two trihedrons or corner reflectors oriented for optimum reflection of a narrow beam of electromagnetic waves travelling along any path substantially within a selected plane parallel to the surface of the earth;

In the several figures of the drawing, like numerals or letters refer to like parts of the device of the present invention.

Figure 1:
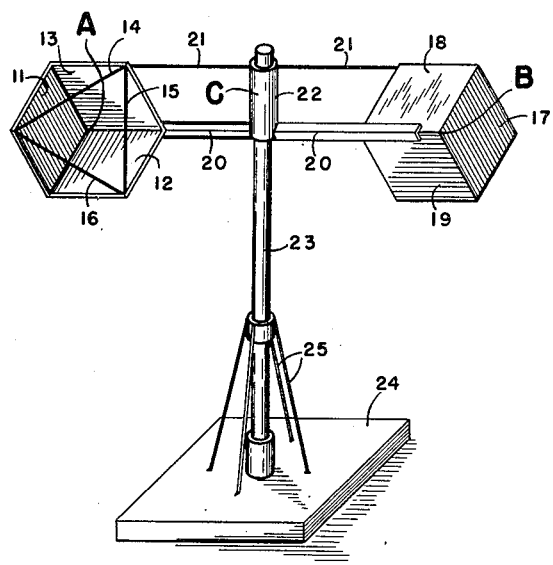
Fig. 1a is a perspective view of a modified positioning of the trihedrons shown in Fig. 1.

Referring first to Fig. 1, the letter A designates generally a rectilinear trihedron constructed from three mutually perpendicular and intersecting plane surfaces or metal plates 11, 12, and 13. In a preferred embodiment of the device of the present invention each of plates 11, 12, and 13 present square surfaces as represented in the drawing. Alternatively square plates 11, 12, and 13 may be replaced by right isosceles triangular plates which are rigidly joined together to form a rectilinear trihedral angle. When the device illustrated in Fig. 1 is intended to be moved from place to place, plates 11, 12, and 13 are preferably rigidly braced together as by diagonal braces 14, 15, and 16. For statisfactory results to be obtained in reflecting electromagnetic waves having wave lengths of about 3 to 10 centimeters or less over appreciable distances, each of the angles formed by the intersections of plates 11, 12, and 13 must not vary more than a small fraction of a degree from a 90° angle. This angular tolerance becomes increasingly important as the wave length decreases. The tolerance also becomes increasingly important as the area of each plate becomes larger or is changed from a triangle to a square surface.

The letter B designates generally a second rectilinear trihedron constructed from three plane surfaces or plates 17, 18, and 19. Trihedron B is substantially identical to trihedron A and is preferably braced by diagonal braces not visible in the perspective view of Fig. 1.

In accordance with my invention trihedrons A and B are rigidly secured to a spacing member designated generally by the letter C. Spacing member C will include a horizontal arm 20 and may include one or more brace members, such as brace 21 secured to plates 12 and 18, which, in turn, may be joined to arm 20 through a spacing element 22. As may be seen from the drawing, trihedrons A and B are spaced substantially equidistant from a central axis, or axis of rotation, which bisects arm 20 perpendicularly thereto. Spacing member C is journaled for free rotation about this central axis by suitable bearings or bushings set centrally in arm 20 or in element 22. Spacing member C may be supported for rotation by a rod or mast 23.

Trihedrons A and B are secured to arm 20 in backto-back relation, that is, with the dihedral angle defined by plates 12 and 13 facing in the opposite direction from the dihedral angle defined by plates 18 and 19. The dihedral angles defined by plates 12 and 13 and plates 18 and 19 may be oriented for any desired angle of elevation or declination with respect to the horizon depending upon the angle of the path of waves it is desired to reflect most efficiently, but, in any case, these dihedral angles should be oriented for substantially identical angles of elevation. When it is desired to reflect a narrow beam of waves travelling substantially in a horizontal plane, the above-mentioned dihedral angles are preferably oriented in a manner such that they are bisected by said plane.

In the drawing, plate 11 is illustrated as secured to the extreme left-hand or outside edges of plates 12 and 13, and plate 17 is secured to the extreme right-hand (as viewed in the drawing) or outside edges of plates 18 and 19. While this arrangement is preferred, plates 11 and 17 may be secured to the inside edges of plates 12 and 13, and plates 18 and 19, respectively, as illustrated in Fig. 1a, and some of the advantages of the present invention will be obtained. The term "back-to-back relation" as used herein and in the appended claims is intended to encompass both of the above-described arrangements.

So that the marker reflector device of Fig. 1 may be conveniently moved about from place to place for surveying purposes, mast 23 may be erected in vertical position upon a movable platform 24. If required, support member 23 may be braced in upright position by braces 25.

It will be seen from Fig. 1 that the trihedrons A and B, when constructed from an electromagnetic wave-reflecting material, may serve not only as efficient wave reflectors but will also behave as wind cups. I have found that, when trihedrons A and B are carefully constructed from one-quarter inch thick square plates of aluminum measuring 18 inches along each side, and when these trihedrons are mounted as illustrated in Fig. 1, the arm 20, carrying trihedrons A and B, revolves slowly about the vertical axis of mast 23 in a light, barely perceptible breeze and, furthermore, revolves at the relatively slow rate of about 18 revolutions per minute in a 15 mile per hour wind. The revolution rate appears not to be a linear function of the wind velocity. I have further found that a marker reflector, constructed as above described and mounted at an elevation of four feet, was readily observed on the plan-position-indicator of a conventional radar system employing 3 centimeter waves at a distance in excess of about 5 nautical miles over water.

Figure 2:
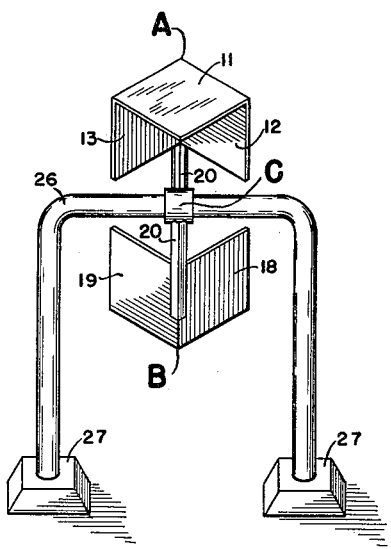
Fig. 2 is a perspective view of an embodiment of the invention similar to the embodiment shown in Fig. 1 but oriented for optimum reflection of waves travelling along any path substantially within a selected plane perpendicular to the surface of the earth.

Referring now to Fig. 2 of the drawing, a second embodiment of my invention is disclosed. The embodiment of Fig. 2 is similar to the embodiment of Fig. 1 except that vertical support member 23 is replaced by an inverted U-shaped member 26 carrying arm 20 in a manner such that the latter may rotate in a vertical plane. Support member 26 may be mounted in upright position upon a platform similar to platform 24 shown in Fig. 1 or may be secured in the earth, as by concrete piers 27 shown in Fig. 2.

For simplification of the drawing, braces 14, 15, 16, and 21 shown in Fig. 1 have not been shown in Fig. 2 but it will be understood that such bracing members may be included in the latter embodiment when desired.

Whereas the embodiment of Fig. 1 is primarily useful as a marker or reflector of beams of electromagnetic waves travelling substantially in or parallel to a horizontal plane passing through arm 20 as, for example, a radar beam emitted from a ship scanning a shore line, the embodiment of Fig. 2 is a primarily useful as a reflector of waves arriving from various altitudes, such as from an aircraft flying at a distance above and in line with the marker device.

Figure 3:
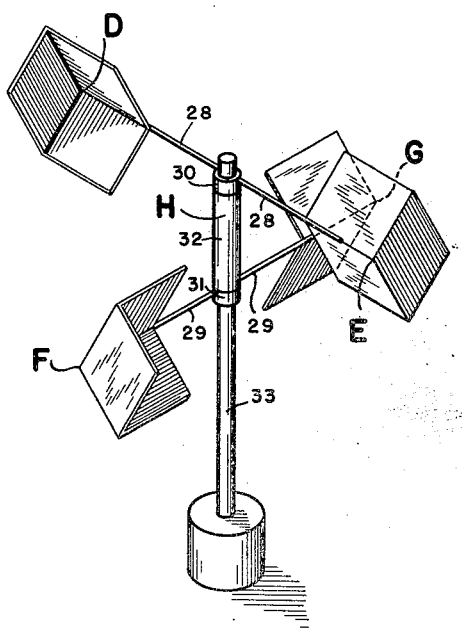
Fig. 3 is a perspective view of another embodiment of the invention employing more than one pair of trihedrons oriented in the manner described with respect to Fig. 1.
Figure 4:
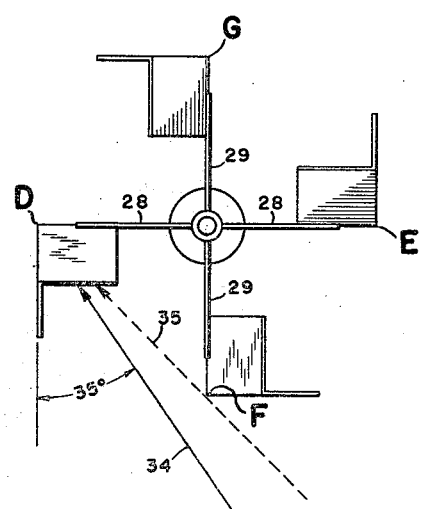
Fig. 4 is a plan view of the embodiment of Fig. 3.

As will be appreciated by workers in the art, when a radar system emits a beam of electromagnetic waves directed from a distance at a device in accordance with one of the embodiments described above, at least a part of the waves may be reflected back and be received by the radar receiver. The intensity of the signal displayed by the receiver will depend upon whether or not the beam enters one of the trihedrons. Since the latter are normally revolving about an axis of revolution, there will be moments when a relatively intense signal is received, and moments when substantially no signal is received. The frequency of the moments of intense signal will depend upon the rate of revolution of the arm 20 carrying trihedrons A and B. Under certain conditions, it may be desirable to increase the frequency of these moments of intense signal. Referring to Figs. 3 and 4 an embodiment of my invention is shown wherein the frequency of moments of intense reflection of waves to a selected station is double for a given rate of rotation as compared with the embodiment shown in Fig. 1. In accordance with an embodiment of my invention, such as is illustrated in Figs. 3 and 4, I employ a plurality of trihedrons such as are designated generally by D, E, F, and G. Trihedrons D, E, F, and G are constructed identical to the trihedrons A and B described in connection with Fig. 1. Trihedrons D and E are secured in back-to-back relation to each other at opposite extremities of a horizontal arm 28. Similarly, trihedrons F and G are secured in back-to-back relation at opposite extremities of a horizontal arm 29. Midway between the extremities of the arms 28 and 29 are journals or bearing members 30 and 31, respectively. Arms 28 and 29, together with the journal members 30 and 31, comprise a spacing member designated generally by the letter H which may also include a vertical spacing element 32. The arms 28 and 29 are preferably arranged mutually perpendicularly to each other and in parallel planes. However, under certain conditions, arms 28 and 29 may be arranged in a common plane or they may be arranged in other than mutually perpendicular relation to each other. Passing through the journals 30 and 31, and perpendicular to the arms 28 and 29, is a support member 33. In the drawing of Fig. 3, the support member 33 is equivalent to the support member 23. It may, however, be replaced by an inverted U-shaped support member similar to support member 26 shown in Fig. 2.

As has been mentioned hereinbefore, the optimum path at which a narrow beam of electromagnetic waves may enter a trihedral angle and be reflected back along the path of approach is in a plane which bisects the dihedral angle formed by two of the plane surfaces in the trihedron and makes an angle of about 35° with the surface of the third plane surface making up the trihedron. Fig. 4 illustrates a plan view of the embodiment shown in perspective in Fig. 3. In the drawing of Fig. 4, it is assumed that the upper and lower plane surfaces of each trihedron are arranged at right angles to each other and the dihedral angle formed by these two surfaces is bisected by a horizontal plane. Under these conditions a narrow beam of rays entering the trihedral angle at its apex would approach on an angle of 35° with respect to the third plane surface of the trihedron. This path is represented by the line 34. It will be seen that when arms 28 and 29 are of equal length and trihedrons D, E, F, and G are of identical size, the trihedron F does not intersect the optimum path 34. However, if the trihedrons are tilted in such a manner that a horizontal beam enters the dihedral angle formed by the upper and lower plane surfaces in a manner such to to make an angle of 35° with either of said surfaces, then the optimum path of approach will be along a line represented by the broken line 35 which makes an angle of 45° with the third plane of the trihedron. Under these conditions trihedron F would intercept the optimum path of the beam into trihedron D unless arm 29 were displaced above or below arm 28. Accordingly, it will be understood that arms 28 and 29 may, under certain conditions, be arranged in the same plane, whereas, under other conditions, they should be arranged in spaced parallel planes.

Although in Fig. 4, two pairs of trihedrons or reflectors have been illustrated, it will be understood that additional pairs of trihedrons arranged on additional spacing arms may be employed. It will also be apparent that the trihedrons need not necessarily be arranged in pairs. Thus, three trihedrons secured at the outer extremities of three spacing arms arranged 120° apart in symmetrical spoke-like fashion around a central axis of rotation might also be employed as shown in plan view in Fig. 5.

Figure 5:
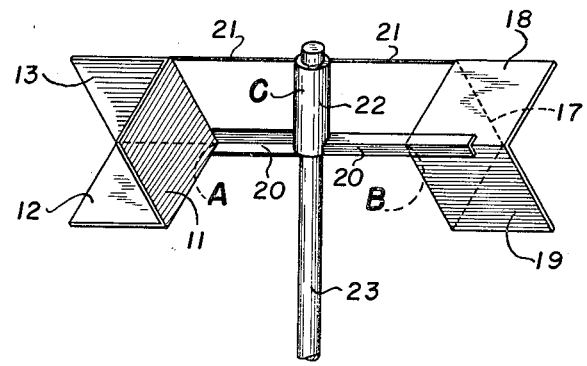
Fig. 5 is a plan view of still another embodiment of the invention employing an odd number of trihedrons oriented in the manner described with respect to Fig. 1.
Figure 5:
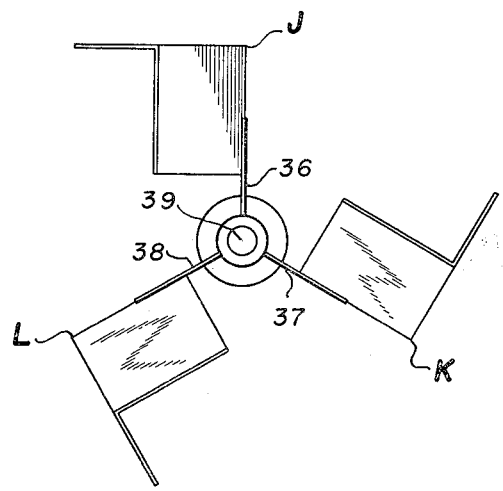

Referring to Fig. 5 of the drawing it may be seen that three trihedrons J, K and L are mounted at the outer ends of three substantially equi-length arms 36, 37 and 38 which are journaled for rotation about a mast or other support member 39. The trihedral angles of trihedrons J, K and L, like those of trihedrons A and B of Figs. 1, 1a, and 2, and trihedrons D, E, F, and G of Figs. 3 and 4, are equally oriented to face substantially contra to direction of rotation about support member 39.

As used herein and in the appended claims, the expression "equally oriented to face substantially contra to direction of rotation" will be understood to describe equal, or uniform, orientation of the several trihedrons substantially as shown in the various figures of the drawing; that is, orientation in a manner such that wind currents, moving predominantly in a given direction, will enter the trihedral angles of the several trihedrons successively and thereby produce a turning moment about the support member. The expression will also be understood to describe uniform orientation of the several trihedrons in a manner such that a narrow beam of electromagnetic waves which enters one of the trihedrons and is reflected along a given reflection path will also enter the other trihedrons successively and be reflected along substantially the same reflection path while the trihedrons rotate about the support member.

From the foregoing description and from the showing in the several figures of the drawing it will be evident that no mechanical shielding whatsoever is placed around the trihedrons carried upon the rotating spacing members, and the trihedral angle in each trihedron is, therefore, fully exposed to electromagnetic wave beams which may be directed thereat. Furthermore, wind or air currents moving from any given direction are not deflected but tend to impinge simultaneously upon two trihedrons which face in opposite directions. Because of the greater wind resistance presented by the interior surface of each trihedron as compared with the wind resistance of the exterior surface thereof, a turning moment is produced and the spacing arms carrying the trihedrons revolve slowly around the support member as an axis.

Having fully described and illustrated the present invention, what I desire to claim and secure by Letters Patent is:

1. A wind-driven rotating reflector of electromagnetic waves adapted to rotate slowly in the wind at a rate unrelated to wind velocity comprising a support member, a plurality of arms carried by said support member and journaled for free rotation about a central axis which is substantially perpendicular to said arms, and a plurality of trihedrons each consisting of three electromagnetic wave-reflecting metal plane surfaces rigidly secured together in mutually perpendicular relation to each other and defining a right trihedral angle therebetween, each one of said trihedrons being fixedly secured to the outer extremity of one of said arms in spaced relation around said central axis with the trihedral angle in each trihedron oriented to face substantially contra to a predetermined direction of rotation about said central axis and with each of said trihedral angles fully exposed to said electromagnetic waves on rotation of said arms, said trihedrons serving as wind cups to rotate said arms about said central axis and as electromagnetic wave reflecting surfaces to reflect said microwaves.

2. A wind-driven rotating reflector of electromagnetic micro-waves adapted to rotate slowly in the wind at a rate unrelated to wind velocity comprising a support member, at least one elongated arm carried by said support member and journaled for free rotation about a central axis which is substantially perpendicular to said arm, and a pair of trihedrons each of which consists of three mutually perpendicular metal plane surfaces rigidly secured together along two abutting edges of each said surface and defining a right trihedral angle therebetween, said pair of trihedrons being fixedly secured to said arm at opposite extremities thereof with the trihedral angle in each trihedron oriented to face substantially contra to a predetermined direction of rotation about said central axis and with each of said trihedral angles fully exposed to said micro-waves on rotation of said arm, said trihedrons serving as wind cups to rotate said arm about said central axis and as electromagnetic wave reflecting surfaces to reflect said micro-waves.

3. A rotating reflector device in accordance with claim 1 in which said central axis is substantially perpendicular to the surface of the earth.

4. A rotating reflector device in accordance with claim 1 in which said central axis is substantially parallel to the surface of the earth.

References Cited in the file of this patent

UNITED STATES PATENTS

| Number | Name | Date |
|---|---|---|
| 362,557 | Vanpelt et al. | May 10, 1887 |
| 1,315,595 | Clark | Sept. 9, 1919 |
| 1,384,014 | Fessenden | July 5, 1921 |
| 2,151,336 | Scharlau | Mar. 21, 1939 |
| 2,212,110 | Beuermann | Aug. 20, 1940 |
| 2,472,212 | Hudspeth | June 7, 1949 |

FOREIGN PATENTS

| Number | Country | Date |
|---|---|---|
| 365,643 | France | July 3, 1906 |